United States Patent
Pataut et al.

(10) Patent No.: US 11,951,784 B2
(45) Date of Patent: *Apr. 9, 2024

(54) TIRE COMPRISING REINFORCING ELEMENTS IN THE FORM OF LAMINATED STRIPS

(71) Applicant: COMPAGNIE GENERALE DES ETABLISSEMENTS MICHELIN, Clermont-Ferrand (FR)

(72) Inventors: Gael Pataut, Clermont-Ferrand (FR); Sebastien Rigo, Clermont-Ferrand (FR)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 617 days.

This patent is subject to a terminal disclaimer.

(21) Appl. No.: 16/757,647

(22) PCT Filed: Oct. 22, 2018

(86) PCT No.: PCT/FR2018/052625
§ 371 (c)(1),
(2) Date: Apr. 20, 2020

(87) PCT Pub. No.: WO2019/077290
PCT Pub. Date: Apr. 25, 2019

(65) Prior Publication Data
US 2020/0324578 A1    Oct. 15, 2020

(30) Foreign Application Priority Data
Oct. 20, 2017 (FR) ........................... 1759913

(51) Int. Cl.
B60C 9/18     (2006.01)
B60C 9/00     (2006.01)
B60C 9/22     (2006.01)

(52) U.S. Cl.
CPC .......... *B60C 9/2204* (2013.01); *B60C 9/0042* (2013.01); *B60C 9/005* (2013.01);
(Continued)

(58) Field of Classification Search
CPC ....... B60C 9/18; B60C 9/1807; B60C 9/1821; B60C 2009/1814; B60C 2009/2012;
(Continued)

(56) References Cited

U.S. PATENT DOCUMENTS 1,349,914 A    8/1920  Pratt
3,730,244 A    5/1973  Ross
(Continued)

FOREIGN PATENT DOCUMENTS

DE    10 2006 061 389 A1    6/2008
EP          0101400 A2       2/1984
(Continued)

OTHER PUBLICATIONS

Machine tranlsation of EP 2781370, 2014.*
(Continued)

*Primary Examiner* — Justin R Fischer
(74) *Attorney, Agent, or Firm* — VENABLE LLP

(57) ABSTRACT

The tire comprises a carcass ply connecting two beads via two sidewalls, the carcass ply being surmounted radially towards the outside of the tire by a crown reinforcing zone which is itself surmounted radially towards the outside of the tire by a tread, the crown reinforcing zone comprising a plurality of reinforcing strips arranged over at least one ply of strips. The strips are arranged so that they are juxtaposed and at an angle less than or equal to 15° with respect to the circumferential direction. Each reinforcing strip is made up of a laminate of at least 3 composite layers, each composite layer containing oriented fibers having a tensile modulus
(Continued)

less than or equal to 30 GPa, which are parallel to one another and coated in a polymer matrix.

8 Claims, 2 Drawing Sheets

(52) U.S. Cl.
CPC .... B60C 9/1821 (2013.01); *B60C 2009/2214* (2013.01); *B60C 2009/2233* (2013.01); *B60C 2009/2242* (2013.01)

(58) Field of Classification Search
CPC .... B60C 2009/2035; B60C 2009/2252; B60C 2009/2261; B60C 9/2204
See application file for complete search history.

(56) References Cited

U.S. PATENT DOCUMENTS

| | | | |
|---|---|---|---|
| 4,108,228 | A | 8/1978 | Tiemann |
| 4,688,615 | A | 8/1987 | Lee |
| 5,879,484 | A | 3/1999 | Spragg et al. |
| 6,405,773 | B1 | 6/2002 | Vossberg et al. |
| 6,769,465 | B2 | 8/2004 | Rhyne et al. |
| 6,994,134 | B2 | 2/2006 | Grah |
| 7,013,939 | B2 | 3/2006 | Rhyne et al. |
| 7,199,175 | B2 | 4/2007 | Vasseur |
| 7,201,194 | B2 | 4/2007 | Rhyne et al. |
| 7,900,667 | B2 | 3/2011 | Vasseur |
| 8,215,351 | B2 | 7/2012 | Thompson |
| 8,960,252 | B2 | 2/2015 | Deal |
| 10,105,989 | B2 | 10/2018 | Cron et al. |
| 10,953,696 | B2 | 3/2021 | Thompson |
| 2003/0205306 | A1 | 11/2003 | Steinke |
| 2003/0212185 | A1 | 11/2003 | Vasseur |
| 2007/0112120 | A1 | 5/2007 | Vasseur |
| 2007/0267116 | A1 | 11/2007 | Rhyne et al. |
| 2010/0018621 | A1 | 1/2010 | Thompson |
| 2010/0288414 | A1* | 11/2010 | Ueda .............. B60C 9/2009 152/527 |
| 2012/0090755 | A1 | 4/2012 | Deal |
| 2012/0318417 | A1 | 12/2012 | Dotson et al. |
| 2014/0326374 | A1 | 11/2014 | Cron et al. |
| 2018/0029422 | A1 | 2/2018 | Thompson |
| 2018/0111419 | A1 | 4/2018 | Fabre et al. |
| 2018/0207987 | A1 | 7/2018 | Bosquet et al. |
| 2019/0054767 | A1 | 2/2019 | Cron et al. |
| 2020/0139764 | A1 | 5/2020 | Merino Lopez et al. |
| 2020/0331300 | A1 | 10/2020 | Pataut et al. |
| 2021/0070106 | A1 | 3/2021 | Merino Lopez et al. |

FOREIGN PATENT DOCUMENTS

| | | | |
|---|---|---|---|
| EP | 0853009 | A2 | 7/1998 |
| EP | 2 765 333 | A1 | 8/2014 |
| EP | 2 781 370 | A1 | 9/2014 |
| EP | 2 957 436 | A1 | 12/2015 |
| EP | 3 181 374 | A1 | 6/2017 |
| JP | 2001-121915 | * | 5/2001 |
| JP | 2003-94908 | A | 4/2003 |
| JP | 4705288 | * | 6/2011 |
| WO | 02/10269 | A2 | 2/2002 |
| WO | 2008/118983 | A1 | 10/2008 |
| WO | 2010/115860 | A1 | 10/2010 |
| WO | 2013/095499 | A1 | 6/2013 |
| WO | 2016/156434 | A1 | 10/2016 |
| WO | 2016/198171 | A1 | 12/2016 |
| WO | 2017/013575 | A1 | 1/2017 |
| WO | 2017/111944 | A1 | 6/2017 |
| WO | 2018/234989 | A1 | 12/2018 |
| WO | 2019/115905 | A1 | 6/2019 |

OTHER PUBLICATIONS

International Search Report dated Jan. 18, 2019, in corresponding PCT/FR2018/052625 (6 pages).
French Search Report dated Apr. 16, 2018, in corresponding FR 1759913 (2 pages).

* cited by examiner

TIRE COMPRISING REINFORCING ELEMENTS IN THE FORM OF LAMINATED STRIPS

BACKGROUND

The present invention relates to tyre reinforcing elements. It relates more particularly to tyre crown architectural elements.

Radial-carcass tyres, commonly referred to as "radial tyres", have gradually become established in the majority of markets, and in particular the market for passenger vehicle tyres. This success is due in particular to the qualities of endurance, comfort, lightness of weight and low rolling resistance that radial tyres have to offer.

Radial tyres are essentially made up of flexible sidewalls and a stiffer crown, the sidewalls extending radially from the beads to the shoulders delimiting the crown, the crown supporting the tread of the tyre. Since each of these parts of the tyre has its own functions, the reinforcement thereof is also specific. One characteristic of radial tyre technology is that it makes it possible to precisely adapt the reinforcement of each of these parts in a relatively independent manner.

A passenger-vehicle radial tyre comprises, as is known, a radial carcass reinforcement made up of reinforcers (generally textile) connecting the two beads of the tyre, and a crown reinforcement comprising:
  two crossed crown triangulation layers (or plies) that consist essentially of (generally metal) reinforcers that each make an angle of about 30 degrees with the circumferential direction of the tyre;
  a crown belt that consists essentially of reinforcers virtually parallel to the circumferential direction of the tyre, often referred to as 0 degree reinforcers even though they generally make a non-zero angle with the circumferential direction, for example an angle ranging from 0 to 10 degrees.

Put simply, the carcass has the primary function of containing the internal pressure of the tyre, the crossed plies have the primary function of giving the tyre its cornering stiffness, and the crown belt has the primary function of withstanding crown centrifugation at high speed. Moreover, the cooperation of all of these reinforcement elements creates what is known as the "crown triangulation". It is this triangulation which gives the tyre its capacity to maintain a relatively cylindrical shape under the various stresses.

Each of these crown reinforcement elements is generally associated, by skimming, with elastomeric compounds. The stack of these elements is then joined together during the vulcanization of the tyre.

After several decades of research, progress and optimization of the radial tyre architecture, it is the combination of all of these reinforcement elements (carcass, crossed layers, belt) that allows the radial tyre to achieve the undeniable comfort, longevity and cost performance that has made it the success it is. Throughout this development, attempts have been made to improve the performance of the tyres, for example in terms of their mass and their rolling resistance. Thus the crown of radial tyres has gradually been reduced in thickness as increasingly high-performance reinforcers have been adopted and increasingly thinner layers of skim rubber have been used so that the lightest possible tyres having a lower rolling resistance can be manufactured.

Document WO2010115860 describes a passenger vehicle tyre in which the crown reinforcement is made up of three distinct and separate elements: a radial carcass reinforcement made of reinforcers that connect the two beads of the tyre, a crown belt essentially made up of reinforcing elements parallel to the circumferential direction of the tyre, and a triangulation crown layer essentially made up of reinforcing elements that make an angle with the circumference of the tyre. Such an architecture has numerous advantages from the point of view of the performance of the tyre, but involves a complicated manufacturing process with numerous steps. Finally, the number of sub-layers that are present limits the potential savings in terms of mass.

Document EP 0101400 describes a radial tyre having a plurality of semi-rigid annular bands disposed in a crown portion of the tyre. The bands are arranged substantially across the entire width of the tread of the tyre. According to one particular embodiment, the tread comprises a reinforcing structure having a central band and two side bands. The bands, which are relatively wide and independent of one another, each comprise fibrous reinforcers incorporated in an epoxy resin matrix, forming a semi-rigid hoops structure. This then is found to be highly complex to produce.

In order to alleviate these various disadvantages, notably the complexity of production, document WO2017/013575 describes a tyre for a passenger vehicle comprising a crown reinforcing zone comprising two radially superposed layers, each layer being made up of composite strips coated with an elastomer composition and arranged juxtaposed with one another and at an angle of around 0° with respect to the circumferential direction, and which can incorporate a thermoplastic film.

However, there is still a need to optimize the performance still further in terms of tensile stiffness and shear stiffness while at the same time minimizing the mass of the crown reinforcing zone of the tyres.

The Applicant Company, in pursuing its research, has discovered that a novel architecture of crown reinforcing zone made it possible, while continuing to alleviate the known disadvantages of the conventional architectures, to improve, very surprisingly, the rolling resistance of the tyres having such a novel architecture.

SUMMARY

One subject of the invention is therefore a tyre comprising a carcass ply connecting two beads via two sidewalls, the said carcass ply being surmounted radially towards the outside of the tyre by a crown reinforcing zone which is itself surmounted radially towards the outside of the tyre by a tread, the crown reinforcing zone comprising a plurality of reinforcing strips arranged over at least one ply of strips, the said strips (14) being arranged so that they are juxtaposed and at an angle less than or equal to 15° with respect to the circumferential direction, characterized in that each reinforcing strip is made up of a laminate of at least 3 composite layers, each composite layer containing oriented fibres having a tensile modulus less than or equal to 30 GPa, which are parallel to one another and coated in a polymer matrix.

What is meant by a tyre is a casing which, once mounted on a mounting support, for example a wheel rim, delimits a closed cavity, it being possible for this cavity to be pressurized with a gas.

According to the invention, each strip forms an angle less than or equal to 15° with the circumferential direction of the tyre. Specifically, each strip, on account of its shape, extends in a main direction along its longest length, and this main direction of the strip forms an angle less than or equal to 15° with the circumferential direction of the tyre.

In a first embodiment, the oriented fibres consist of mutually parallel individual spun fibres known as "rovings".

In this embodiment, each composite layer is made up of the oriented fibres coated in the polymer matrix.

In a second embodiment, the oriented fibres consist of filamentary elements of a fabric comprising substantially mutually parallel first filamentary elements and substantially mutually parallel second filamentary elements interlacing with the first filamentary elements, the oriented fibres being either the first filamentary elements or the second filamentary elements. This second embodiment thus makes it possible to create a single composite layer comprising first and second oriented fibres belonging to the one same fabric wherever the first embodiment would have required two composite layers each comprising oriented fibres.

In one preferred embodiment, with the tyre comprising a crown surmounting the carcass ply, radially towards the outside of the tyre, and comprising the tread and the crown reinforcing zone, the crown is, with the exception of the crown reinforcing zone, devoid of any ply reinforced by filamentary reinforcing elements arranged substantially parallel to one another and embedded in a matrix of rubber composition. The filamentary reinforcing elements of such reinforced plies excluded from the crown of the tyre comprise the metal filamentary reinforcing elements and the textile filamentary reinforcing elements.

In one highly preferred embodiment, with the tyre comprising a crown surmounting the carcass ply, radially towards the outside of the tyre, the crown is made up of the crown reinforcing zone and the tread.

In one even more preferred embodiment, the crown reinforcing zone is, with the exception of the ply or plies of strips embedded in the matrix of rubber composition, devoid of any ply that is reinforced by filamentary reinforcing elements arranged substantially parallel to one another and embedded in a matrix of rubber compound. The filamentary reinforcing elements of such reinforced plies excluded from the crown reinforcing zone of the tyre comprise the metal filamentary reinforcing elements and the textile filamentary reinforcing elements.

In the most preferred embodiment, the crown reinforcing zone is made up of the ply or plies of strips embedded in the matrix of rubber composition.

Furthermore, highly advantageously, the tyre is, radially between the carcass ply and the crown, devoid of any ply that is reinforced by filamentary reinforcing elements arranged substantially parallel to one another and embedded in a matrix of rubber composition. The filamentary reinforcing elements of such reinforced plies excluded from in between the carcass ply and the crown comprise the metal filamentary reinforcing elements and the textile filamentary reinforcing elements.

In one preferred embodiment that makes it possible to improve the mechanical properties of the tyre, the crown reinforcing zone comprises at least two plies of strips, a first ply of strips radially on the inside and a second ply of strips radially on the outside, the said strips of each first and second ply of strips being arranged so that they are juxtaposed with each other and at an angle less than or equal to 15° with respect to the circumferential direction.

Still in an embodiment that makes it possible to improve the mechanical properties of the tyre, the strips of the said second ply of strips overlap the strips of the said first ply of strips by at least 20%. According to a preferred variant embodiment of the invention, the mean overlap between the strips of the two plies of strips is greater than or equal to 40%.

Advantageously, the mean overlap between the strips of the first and second plies of strips is less than or equal to 80%, preferably less than or equal to 60%.

The mean overlap between the first and second plies of strips is the mean of the individual overlaps of the strips of the first ply by the strips of the second ply. The individual overlap between a strip of the first ply and one or more strips of the second ply is the ratio, in percent, of the axial width of the radial projection of the strip of the first ply onto the strip or strips of the second ply, to the axial width of the strip of the first ply.

In a variant in which the tyre comprises at least three plies of strips, the mean overlap between the strips of each ply of strips overlapping the strips of the ply of strips radially on the inside thereof is greater than or equal to 20%, preferably greater than or equal to 40%, and less than or equal to 80%, preferably less than or equal to 60%.

According to another preferred variant embodiment of the invention, the strips are arranged in four layers of strips, the strips of each layer of strips overlapping the strips of the layer of strips that is radially on the inside of it by at least 20% and at most 80%.

As a preference, the said strips of each ply of strips are arranged so that they are juxtaposed with one another within each ply and at an angle less than 12° with the circumferential direction, more preferably less than or equal to 10° with the circumferential direction, more preferably still, less than or equal to 5° with the circumferential direction, and highly preferably at a substantially zero angle with the circumferential direction.

Highly advantageously, each ply of strips is embedded in a matrix of rubber composition which, when cross-linked, has a secant extension modulus at 10% strain greater than or equal to 10 MPa.

As a preference, for each composite layer, the angle formed by the oriented fibres with the circumferential direction ranges from −90° to 90°.

The positive or negative sign of an angle is defined by its orientation, namely the direction, clockwise or anticlockwise, in which it is necessary to rotate from a reference straight line, in this instance the circumferential direction of the tyre, defining the angle in order to reach the other straight line defining the angle. For example, it may be adopted by convention that an angle oriented in the anticlockwise direction from the reference straight line, in this instance the circumferential direction, has a positive sign and that an angle oriented in the clockwise direction from the reference straight line, in this instance the circumferential direction, has a negative sign. Equally, the reverse convention could be adopted.

According to one preferred embodiment of the invention, each laminate comprises:
  n interior composite layer(s) each having fibres of which the angle with the circumferential direction is, in terms of absolute value, less than or equal to 10°, n being a number greater than or equal to 1, preferably ranging from 1 to 20, and in the case where n>1, these interior composite layers being juxtaposed with one another and flanked on each side respectively by m exterior composite layers,
  each exterior composite layer having fibres that make with the circumferential direction an angle distinct from 0°, m ranging from 1 to 8 and, in the case where m>1, the angle of the fibres of the successive exterior composite layers positioned on the one same side of the interior composite layer or layers being identical or different.

In preferred embodiments, the angle of the oriented fibres of each interior composite layer is, in terms of absolute value, less than or equal to 5° and more preferably substantially zero. Still as a preference, the angle of the oriented fibres of each exterior composite layer is, in terms of absolute value, strictly greater than 10°, preferably, in terms of absolute value, ranges from 30° to 60°. What is meant by an absolute value ranging from 30° to 60° is that the angle ranges from −30° to −60° when the angle is oriented negatively, and from 30° to 60° when the angle is oriented positively.

Advantageously, the angle of the fibres of two exterior composite layers positioned symmetrically on each side of the interior composite layer or layers is identical. Thus, the angles of the fibres of the composite layers compensate for one another and the straightness of each laminate is maximized, making it easier to use in the method for manufacturing the tyre. This also makes it possible to obtain the expected mechanical performance of the laminate within the tyre as compared with a laminate exhibiting straightness defects.

According to another preferred embodiment of the invention, with n being a number greater than or equal to 3, the angle of the fibres of two exterior composite layers arranged symmetrically on each side of the interior composite layers is identical in terms of absolute value but of opposite sign. Thus, the potential lack of straightness caused by the opposition of the signs of the angles of the fibres of the composite layers is compensated for by using a significantly high number of interior composite layers which stiffen the laminate.

BRIEF DESCRIPTION OF THE FIGURES

All the embodiment details are given in the following description, and are illustrated by FIGS. 1 to 4, which are given solely by way of non-limiting examples and in which.

Measurements and Tests

Figure 1:
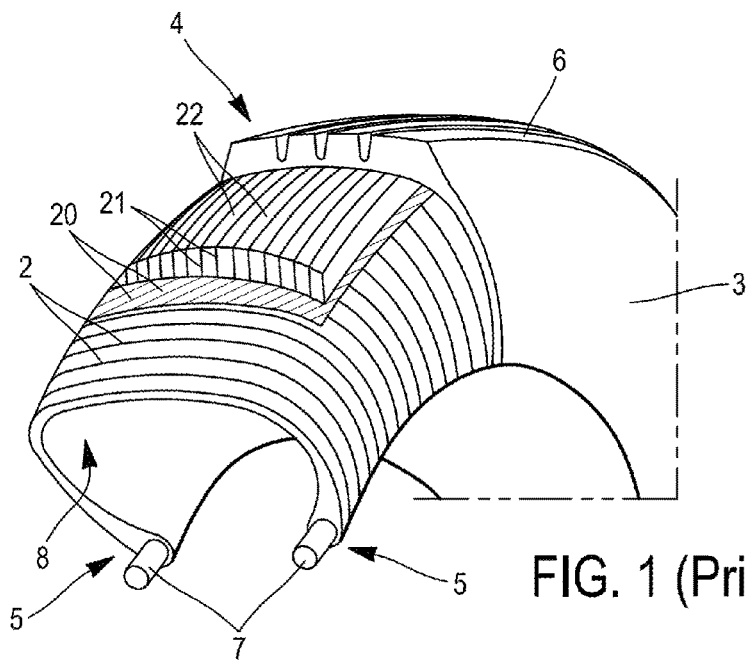
FIG. 1 is a schematic perspective depiction of a tyre according to the prior art.

The rubber compositions are characterized, before and after curing, as indicated below.

Tensile Tests

The measurements are taken in second elongation (i.e. after a cycle of accommodation at the degree of extension intended for the measurement itself). These tensile tests make it possible to determine the elasticity stresses and the properties at break. Unless otherwise indicated, they are carried out in accordance with French Standard NF T 46-002 of September 1988. The nominal secant tensile moduli (or apparent stresses, in MPa) are measured in second elongation (i.e. after an accommodation cycle at the degree of extension intended for the measurement itself) at 10% elongation (denoted MA 10) at 23° C.±2° C., and under normal hygrometry conditions.

Mass of the Tyre

The tyre was weighed using scales. An index of 100 is attributed arbitrarily to the mass of a control tyre. An index lower than 100 for the tyres compared with the control tyre indicates that the compared tyres have a lower mass than the control tyre, something which is highly favourable for rolling resistance performance.

Rolling Resistance

The rolling resistance of the tyres was measured on a rolling road, in accordance with method ISO 87-67 (1992). For greater ease of interpretation, the results are given as a performance to base 100, the value of 100 being attributed to the control. A result lower than 100 indicating a reduction in rolling resistance and therefore an improved performance, and conversely a result higher than 100 will indicate an increase in the rolling resistance of the tyre and therefore a reduction in performance.

DETAILED DESCRIPTION OF THE INVENTION

In the present description, unless expressly indicated otherwise, any range of values denoted by the expression "between a and b" represents the range of values extending from more than "a" to less than "b" (i.e. limits a and b excluded), while any range of values denoted by the expression "from a to b" means the range of values extending from "a" up to "b" (i.e. including the strict limits a and b).

In the present document, the expression "overlap of the strips" means an arrangement in which the strips of a radially outer ply cover or overlap the strips of the radially inner ply, that is to say that the projection in the radial direction of one strip onto the strip at a lower level is not zero. The overlap may vary according to the embodiment. This overlap forms a linkage between the plies, creating cohesion of the whole of the crown reinforcing region. This linkage in particular allows transmission of shear forces between the plies. The presence of the matrix of rubber composition is not taken into consideration in this positioning.

A frame of reference X, Y, Z corresponding to the usual respectively axial (along the Y direction), radial (along the Z direction) and circumferential (along the X direction) orientations of a tyre has been represented in the figures.

A "longitudinal direction" or "circumferential direction" means a direction which corresponds to the periphery of the tyre and which is defined by the direction in which the tyre runs.

An "axial direction" means a direction parallel to the axis of rolling of the tyre.

The "tread" of a tyre means a quantity of elastomeric compound delimited by lateral surfaces and by two main surfaces, one of which is intended to come into contact with a road surface when the tyre is being driven on.

The "sidewall" of a tyre means a lateral surface of the tyre, said surface being disposed between the tread of the tyre and a bead of this tyre.

The "bead" of a tyre means a part of the tyre that is intended to be seated on a wheel rim.

In the present document, a "carcass", or "carcass ply", means a reinforcing structure for a tyre in the form of a layer made up of a matrix of elastomeric material in which filaments or threads, generally textile, are arranged in a substantially parallel and longitudinal alignment. The carcass ply is advantageously manufactured flat, in great lengths, then cut to the appropriate dimensions for the manufacture of a tyre to which the carcass ply is suited.

FIG. 1 illustrates a perspective view of a passenger vehicle tyre, partially cut away layer by layer, according to the prior art. A carcass reinforcement 2 connected to the beads 5 around bead wires 7 extends along the sidewalls 3 and the crown 4. The carcass reinforcement 2 is formed of radially oriented reinforcers. The reinforcers are textile cords (for example made of nylon, rayon, polyester). At the crown of the tyre, the carcass is surmounted by two crossed triangulation layers 20, 21 and a belt 22. The two crossed crown triangulation layers 20, 21 comprise reinforcers oriented at an angle of substantially between 20 and 40 degrees on either side of the circumferential direction of the tyre. Metal cords constitute the reinforcers of the crossed layers 20, 21. A layer 8 of elastomeric sealing compound covers the internal cavity of the tyre. A tread 6 surmounts the whole. This architecture involves several semi-finished layers, requiring a manufacturing method with numerous intermediate steps. The numerous layers render the tyre relatively heavy.

Figure 2:
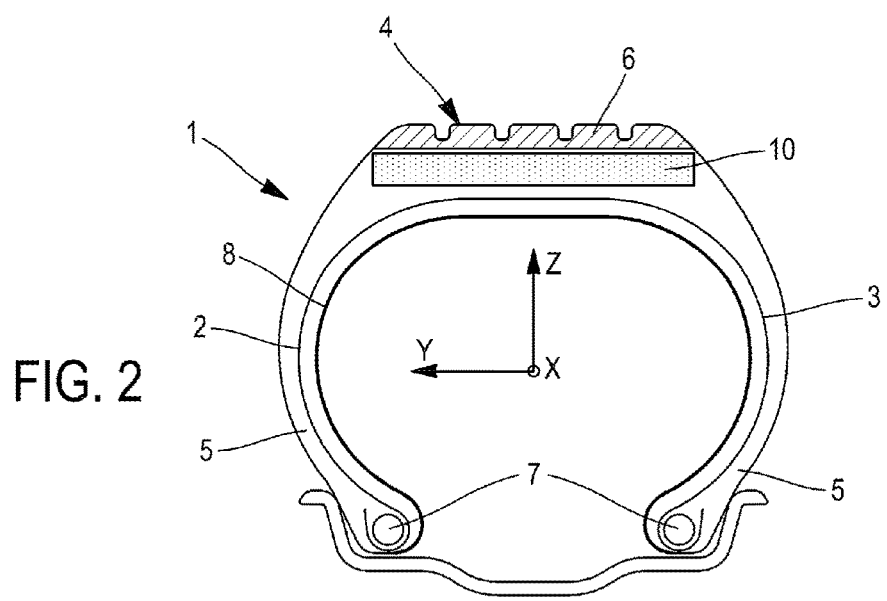
FIG. 2 is a sectional view of a tyre according to the invention.

FIG. 2 shows a tyre 1 according to the invention, comprising sidewalls 3 surmounted by a crown 4 and a carcass ply 2 extending from one bead 5 to the other, passing via the sidewalls 3 and the crown 4. The crown 4 surmounts the carcass ply 2 radially towards the outside of the tyre and comprises, in addition to the tread 6, a crown reinforcing zone 10 provided with strips forming an angle less than or equal to 15° with the circumferential direction, preferably less than 12° with the circumferential direction, more preferably less than or equal to 10° with the circumferential direction, more preferably still, less than or equal to 5° with the circumferential direction, and highly preferably which are circumferential, namely oriented substantially at 0° with respect to the circumferential direction. Various embodiments of the strips are described hereinafter. The crown reinforcing zone 10 is arranged radially between the tread 6 and the carcass ply 2.

Figure 3A:
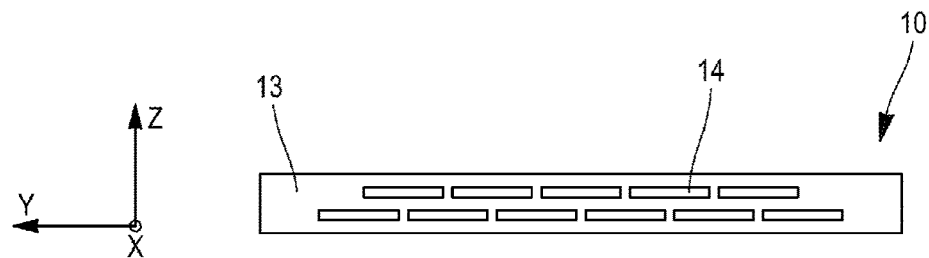
FIG. 3A is a schematic depiction of an example of a tyre crown reinforcer according to the invention, having alignments of strips.

FIG. 3A illustrates a first embodiment of a crown zone 10 according to the invention. According to this embodiment, a plurality of strips (14) constitute two plies of strips, a first ply of strips radially on the inside and a second ply of strips radially on the outside, the strips of said second ply of strips overlapping the strips of said first ply of strips by at least 20%, said strips (14) of said first and second plies of strips being arranged juxtaposed with each other. Each of these plies of strips is embedded in a matrix of rubber composition (13) which, when cross-linked, has a secant extension modulus at 10% strain greater than or equal to 10 MPa.

Each reinforcing strip of the plies of strips is made up of a laminate of at least 3 composite layers, each composite layer comprising mutually-parallel oriented low-modulus fibres (15, 15', 15") making an angle with the circumferential direction, coated in a polymer matrix.

Matrix of Rubber Composition

The expression composition "based on" should be understood as meaning a composition comprising the mixture and/or the reaction product of the various constituents used, some of these base constituents being capable of reacting or intended to react with one another, at least in part, during the various phases of production of the composition, in particular during the crosslinking or vulcanization thereof.

It should be noted that the compounds mentioned below and participating in the preparation of rubber compositions can be of fossil or biosourced origin. In the latter case, they may be partially or totally derived from biomass or may be obtained from renewable starting materials derived from biomass. This applies notably to the polymers, plasticizers, fillers and the like.

The matrix of rubber composition is based on at least one diene or non-diene (for example thermoplastic) elastomer; this is preferably a composition of the cross-linked or cross-linkable type, which is to say that it then comprises a cross-linking system (notably a vulcanizing system) suitable for allowing the composition to cross-link (harden) as it is being cured (or as the rubber item such as the tyre incorporating a crown zone according to the invention is being cured).

As a preference, this matrix of rubber composition has, as a characteristic, its stiffness, namely has the characteristic of having a secant tensile modulus at 10% elongation, the modulus MA10 of each rubber composition being by definition greater than or equal to 10 MPa, preferably greater than 10 MPa.

According to another preferred variant embodiment of the invention, this ply of rubber composition may also exhibit a very high stiffness, namely a modulus MA10 greater than or equal to 30 MPa.

Preferably, the elastomer is a diene elastomer. As is known, diene elastomers can be classified into two categories: "essentially unsaturated" or "essentially saturated". The term "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of alpha-olefins of EPDM type do not come under the above definition and can especially be described as "essentially saturated" diene elastomers (low or very low content of units of diene origin, always less than 15%).

In the category of "essentially unsaturated" diene elastomers, a "highly unsaturated" diene elastomer is understood in particular to mean a diene elastomer having a content of units of diene origin (conjugated dienes) which is greater than 50%.

Although it is applicable to any type of diene elastomer, the present invention is preferably carried out with a diene elastomer of the highly unsaturated type.

This diene elastomer is more preferably selected from the group consisting of polybutadienes (BRs), natural rubber (NR), synthetic polyisoprenes (IRs), butadiene copolymers, isoprene copolymers and mixtures of these elastomers, such copolymers being notably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

The rubber composition may contain a single diene elastomer or several diene elastomers, the latter possibly being used in combination with any type of synthetic elastomer other than a diene elastomer, or even with polymers other than elastomers. The rubber composition can also comprise all or part of the additives known to those skilled in the art and normally used in rubber compositions intended for the manufacture of tyres, such as, for example, reinforcing fillers, such as carbon black or silica, coupling agents, non-reinforcing fillers, plasticizers (plasticizing oils and/or plasticizing resins), pigments, protective agents, such as antiozone waxes, chemical antiozonants, antioxidants, antifatigue agents or reinforcing resins (such as described, for example, in Application WO 02/10269), a crosslinking system, for example based on sulfur and other vulcanizing agents and/or on peroxide and/or on bismaleimide.

A person skilled in the art will know, in the light of the present description, how to adjust the formulation of the rubber composition in order to achieve the desired levels of properties (in particular modulus MA10) and to adapt the formulation to the specific application envisaged.

It is well known to increase the stiffness of rubber compositions by increasing for example their content of reinforcing filler, the content of sulfur and other vulcanizing agents, or else by introducing reinforcing resins, it being possible for all of these solutions to be combined in order to obtain higher stiffnesses.

The space in the radial (or thickness) direction between two successive plies of strips and occupied by the matrix of rubber composition is preferably comprised between 0.05 and 2 mm, more preferably between 0.1 and 1 mm. For example, thicknesses of 0.2 to 0.8 mm have proved to be perfectly suitable for reinforcing a tyre.

Plies of Strips

In a ply of strips, the staggered arrangement of the strips is realized for example by first winding-off starting at a given azimuth, and second winding-off with an identical pitch starting at 180 degrees. As an alternative, the strips are positioned by first winding-off in one given axial direction, followed by second winding-off in the opposite axial direction.

In the exemplary embodiment of FIG. 3A, with a symmetrical disposition, two plies of strips (14) are arranged with a lateral offset between the positions of the strips of the two plies of around half a pitch of the strip. The main plane of each ply is substantially axial. Such an arrangement has the effect of covering the bridges of elastomeric compound of the first ply with the strips that make up the second ply. The bridges of elastomeric compound between the strips of the first ply are thus positioned substantially at the middle of the respective widths of the strips of the adjacent ply. In this example, the radially outer ply has one less winding in order to compensate for the effect of the lateral offset. The mean overlap between the strips of the two plies is at least 20% and preferably greater than 40%, and less than or equal to 80%, preferably less than or equal to 60%.

The exemplary embodiment of FIG. 3A has two plies of the same width, one of which is offset with respect to the other.

In a variant, the starting and end points of the plies may optionally be the same, in order to ensure a certain uniformity.

Figure 3B:
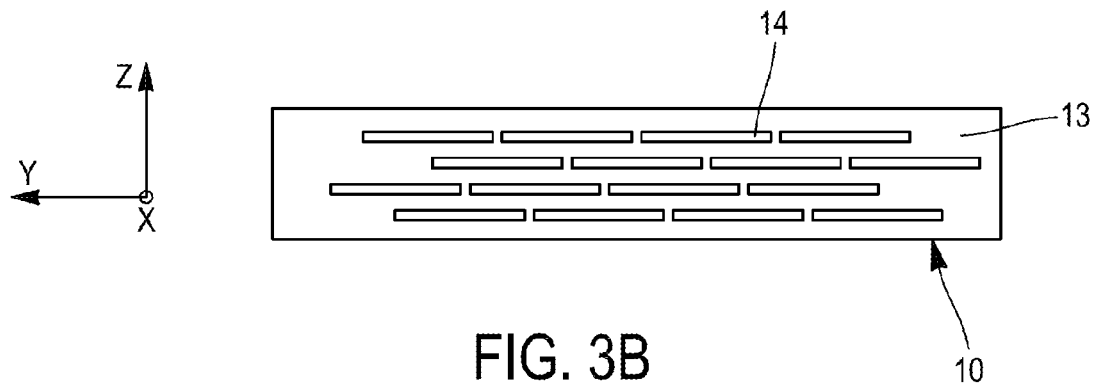
FIG. 3B is a schematic depiction of another example of a tyre crown reinforcer according to the invention, having alignments of strips.

FIG. 3B illustrates another embodiment of a crown zone 10 according to the invention. According to this embodiment, a plurality of strips (14) constitute four plies, the strips of each ply of strips overlapping the strips of the ply of strips radially on the inside thereof by at least 20% and by at most 80%, in this instance by at most 50%, said strips (14) of each ply being arranged juxtaposed with one another and with an angle with respect to the circumferential direction substantially close to 0 degrees, and more broadly speaking at an angle less than or equal to 15° with the circumferential direction, preferably less than the 12° with the circumferential direction, more preferably less than equal to 10° with the circumferential direction, more preferably still, less than or equal to 5° with the circumferential direction. The staggered arrangement of the strips is realized for example by first winding-off starting at a given azimuth, and subsequent windings-off which may begin every 90°.

Composite Strips

Each reinforcing strip (14) is made up of a laminate of at least 3 composite layers, each composite layer comprising mutually-parallel oriented low-modulus fibres making an angle with the circumferential direction, coated in a polymer matrix.

As a preference, the angle formed by the oriented fibres with the circumferential direction ranges from −90° to 90°.

Preferentially, each laminate comprises:
n interior composite layer(s) each having fibres (15) of which the angle with the circumferential direction is, in terms of absolute value, less than or equal to 10°, n being a number greater than or equal to 1, preferably ranging from 1 to 20, more preferably ranging from 1 to 12, and more preferably still, from 1 to 6 and in the case where n>1, these interior composite layers being juxtaposed with one another and flanked on each side respectively by m exterior composite layers,
each exterior composite layer having fibres (15', 15") forming an angle other than 0° with the circumferential direction, m ranging from 1 to 8, and, where m>1 the angle of the fibres (15', 15") of the successive exterior composite layers laid on the one same side of the interior composite layers being identical or different, and the angle of the fibres (15', 15") of two exterior composite layers laid symmetrically one on each side of the interior composite layer or layers being identical.

The total number of layers in the laminate is therefore n+2m.

In this preferred embodiment, the angle of the oriented fibres of each interior composite layer is, in terms of absolute value, less than or equal to 5° and more preferably substantially zero. Still as a preference, the angle of the oriented fibres of each exterior composite layer is, in terms of absolute value, strictly greater than 10°, preferably, in terms of absolute value, ranges from 30° to 60°.

Figure 4:
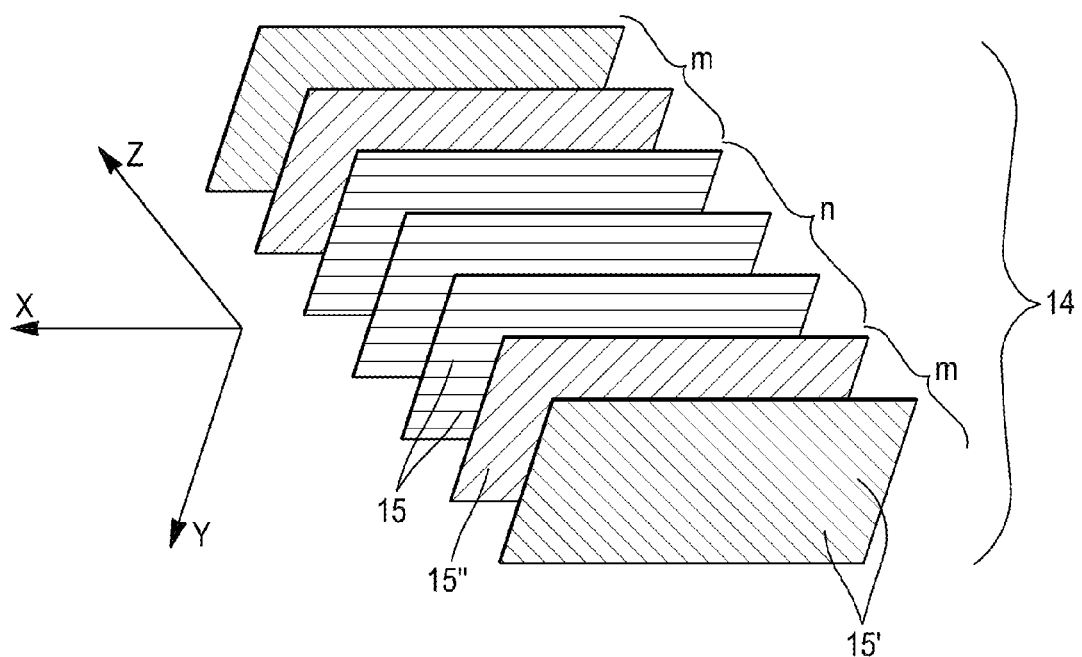
FIG. 4 is an exploded view of one exemplary embodiment of a strip according to the invention, made up of a laminate of 7 composite layers.

FIG. 4 illustrates an embodiment in which n is equal to 3 and m is equal to 2. As a greater preference, the angle of the fibres (15', 15") of the exterior composite layers is equal to +45° or to −45°.

According to a preferred embodiment of the invention, n and m are equal to 1.

According to another preferred embodiment of the invention, n is equal to 1 and m is equal to 2.

According to another embodiment of the invention, each laminate comprises:
n interior composite layers, having fibres (15) of which the angle with the circumferential direction is 0°, n being a number greater than or equal to 3, preferably ranging from 3 to 20, more preferably ranging from 3 to 12, more preferably still from 3 to 6, these interior composite layers being juxtaposed with one another and flanked on each side respectively by m exterior composite layers,
each exterior composite layer having fibres (15', 15") forming an angle other than 0° with the circumferential direction, m ranging from 1 to 8, and, where m>1, the angle of the fibres (15', 15") of the successive exterior composite layers laid on the one same side of the interior composite layers being identical or different, and the angle of the fibres (15', 15") of two exterior composite layers laid symmetrically one on each side of the interior composite layers being identical in terms of absolute value, but of opposite sign.

In this other preferred embodiment, the angle of the oriented fibres of each interior composite layer is, in terms of absolute value, less than or equal to 5° and more preferably substantially zero. Still as a preference, the angle of the oriented fibres of each exterior composite layer is, in terms of absolute value, strictly greater than 10°, preferably, in terms of absolute value, ranges from 30° to 60°.

As a greater preference, the angle of the fibres of the exterior composite layers is equal to +45° or to −45°.

The composite strips may be made from preimpregnated composite layers NTPT 450™ or NTPT ThinPreg 402™ (which can be obtained notably by applying the method described in document WO 2016/198171).

The preimpregnated composite layers are laid raw or unpolymerized at the desired lamination angles and form a width the dimension of which is greater than the width of the strips.

The laminated width is cut into raw or unpolymerized strips of the desired width.

The raw strips are wound off onto a drum of large diameter (i.e. 2 metres in diameter). The strips are cured under vacuum (−850 mbar) and under pressure (5 bar) using the usual curing peripherals (such as peel ply, bleeder cloth, microperforated or non-perforated release film, vacuum-bagging film, etc.).

According to another embodiment, the laminated width is laid on a large-diameter drum and cured under vacuum (−850 mbar) and under pressure (5 bar) using the usual curing peripherals. After curing, the width is cut into strips.

As a preference, the strips have a thickness less than or equal to 1 mm, and more preferably less than or equal to 0.7 mm.

Constituent Components of the Strips

The polymer matrix of each composite layer of laminate of a strip comprises a thermosetting polymer by itself or as a blend with other polymers.

Preferentially, the polymer matrix may be selected from among the thermosetting resins of the polyepoxide, unsaturated polyester, vinyl ester, ester cyanate, bismaleimide, type, polyurethanes, and a blend of such resins. Of the aforementioned resins, those that are particularly suitable are thermosetting resins having a glass transition temperature greater than or equal to 160° C. Note that reinforcing fillers (silica, carbon black) or thermoplastic fillers (Orgasol by Arkema) or elastomeric fillers (Kane Ace by Kaneka) may be added to the above thermosetting resins.

These composite layers preferably have a surface density of around 200 g/m² and a pre-curing thickness of around 0.2 mm.

As a preference, use is made of finer layers having a surface density less than or equal to 80 g/m², more preferably this density ranging from 18 g/m² to 80 g/m², and a pre-curing thickness less than 0.06 mm.

The person skilled in the art will know how to adapt the number of composite layers according to the surface density of these composite layers.

The fibres of each composite layer of laminate contain low-modulus fibres. What is meant in the present application by low modulus is a modulus of extension (Young's modulus) less than or equal to 30 GPa, preferably ranging from 6 GPa to 30 GPa. Such a modulus of extension is measured in accordance with the standard ASTM D4848-98 (2012).

According to a preferred alternative form of embodiment of the invention, the low-modulus fibres of each composite layer of laminate comprise polyethylene terephthalate fibres. Preferentially, the polyethylene terephthalate fibres predominate, which means to say represent more than 50% of the fibres of any one layer.

More preferably still, the fibres of each composite layer of laminate are made up of polyethylene terephthalate fibres.

According to other preferred alternative forms of embodiment of the invention, the fibres of each composite layer of laminate comprise polyamide fibres (such as PA66, PA46, PA6, PA10 in semiaromatic form), cellulose or rayon fibres or else low-modulus thermoplastic fibres).

Each of these types of fibre being able to be used preferably as predominant content, namely to represent over 50% of the fibres of one same layer, and, more preferably still, each of these types of fibre constituting the entirety of the fibres in each composite layer of laminate.

According to one preferred variant of the invention, the polymer matrix/fibre ratio by volume in each composite layer of laminate ranges from 25/75 to 55/45 and preferentially being around 45/55.

EXAMPLES

The examples which follow make it possible to illustrate the invention; however, the invention cannot be limited to these examples alone.

These examples are intended to demonstrate the improved properties of a tyre according to the invention compared with a control tyre comprising a conventional architecture and a tyre according to the prior art.

The following tyres are compared for the same size 245/45R18:
   a tyre PT1 comprises a conventional architecture (crown comprising two crown plies and a layer of nylon threads oriented at 0°),
   a tyre PT2 according to the prior art WO2017/013575 (FIG. 8),
   a tyre PA3 conforming to the invention.

The conforming tyres PT2 and PA3 all comprise a crown reinforcement zone comprising two plies made up of reinforcing strips, of a width of 15 mm, which are juxtaposed with one another and make an angle of around 0° with respect to the circumferential direction, the two plies having a 46% overlap.

The thickness of matrix of rubber composition between the two plies of strips is 0.2 mm, the matrix of rubber composition having a modulus MA10 of 12 MPa.

It will be noted that, unlike the tyre PT1, for the tyres PA3 and PA4, the crown 4 is, with the exception of the crown reinforcing zone 10, devoid of any ply reinforced by filamentary reinforcing elements arranged substantially parallel to one another and embedded in a matrix of rubber composition. The filamentary reinforcing elements of such reinforced plies excluded from the crown of the tyre comprise the metal filamentary reinforcing elements and the textile filamentary reinforcing elements, for example those of tyre PT1. In this instance, for each tyre PA3 and PA4, the crown 4 is made up of the crown reinforcing zone 10 and the tread 6.

It will also be noted that the crown reinforcing zone 10 is, with the exception of the plies of strips embedded in the matrix of rubber composition, devoid of any ply that is reinforced by filamentary reinforcing elements arranged substantially parallel to one another and embedded in a matrix of rubber compound. The filamentary reinforcing elements of such reinforced plies excluded from the crown reinforcing zone of the tyre comprise the metal filamentary reinforcing elements and the textile filamentary reinforcing elements. In this particular instance, for each tyre PA3 and PA4, the crown reinforcing zone 10 is made up of the plies of strips embedded in the matrix of rubber composition.

Finally, it will be noted that each tyre PA3 and PA4 is, radially between the carcass ply 2 and the crown 4, devoid of any ply that is reinforced by filamentary reinforcing elements arranged substantially parallel to one another and embedded in a matrix of rubber composition. The filamentary reinforcing elements of such reinforced plies excluded from in between the carcass ply 2 and the crown 4 comprise the metal filamentary reinforcing elements and the textile filamentary reinforcing elements.

The strips of the tyre PT2 according to the prior art are made with a PET (polyethylene terephthalate) matrix incorporating textile cords (aramid, plied yarns made up of 2 strands of 167 Tex twisted together with a twist of 315 twists per metre at) 0°. They have a thickness of 0.5 mm.

The strips of the tyres PA3 produced according to the embodiment described hereinabove are made up of a laminate comprising 18 composite layers coated in a thermosetting polymer matrix of polyepoxide type (composite layers marketed by the company NTPT under the trade name "ThinPreg 402™"):

- 10 interior composite layers having mutually-parallel oriented fibres making an angle of 0° with the circumferential direction (mass per unit area of each layer 35 g/m$^2$),
- and 4 successive exterior composite layers (−45, +45 and again −45 and +45) laid on each side of the interior composite layers, the two layers adjacent to the interior composite layer having mutually-parallel oriented fibres making an angle of −45° with the circumferential direction, and the two outermost layers having mutually-parallel oriented fibres making an angle of +45° with the circumferential direction.

The strips of the tyre PA3 comprise in their composite layers PET fibres reference 755-220 tex from DuraFiber-Tech with a polymer matrix/fibre ratio by volume in each composite layer of 50/50 and a thickness of 0.85 mm.

The matrix of rubber compositions used here is a conventional composition of modulus (modulus MA10 equal to approximately 12 MPa) typically of the type used in tyre beads (5), based on natural rubber, carbon black (approximately 75 phr), on antioxidant, on a vulcanizing system with a high sulfur content (approximately 5 phr) and the usual vulcanizing additives; it further comprises approximately 10 phr of paraffin oil and 8 phr of tackifying resin (butyl-phenol-acetylene resin).

The adhesion between the plies of strips and the matrix of rubber composition is provided by an adhesive of the RFL type which has been deposited, in a known manner, on the strips.

Table 1 which follows indicates, for each tyre, a comparison of their mass and rolling resistance (with an index of 100 for the conventional control tyre PT1).

Significant improvements in mass and rolling resistance can be seen, these being obtained for the tyres PA3 according to the invention compared with the conventional control tyre PT1, but also against tyre PT2 which is already an improvement on PT1.

TABLE 1

| Tyre | Mass of the tyre | Rolling resistance |
|------|------------------|--------------------|
| PT1  | 100              | 100                |
| PT2  | 93               | 92                 |
| PA3  | 91               | 87                 |

The invention claimed is:

1. A tire comprising a carcass ply connecting two beads via two sidewalls, the carcass ply being surmounted radially toward an outside of the tire by a crown reinforcing zone which is surmounted radially toward the outside of the tire by a tread, the crown reinforcing zone comprising a plurality of reinforcing strips arranged over at least two plies of reinforcing strips, a first ply of reinforcing strips radially on an inside and a second ply of reinforcing strips radially on the outside, and the reinforcing strips being arranged so that they are juxtaposed and at an angle less than or equal to 15° with respect to a circumferential direction, wherein each reinforcing strip is made up of a laminate of at least three composite layers, each composite layer containing oriented fibers having a tensile modulus less than or equal to 30 GPa, which are parallel to one another and coated in a polymer matrix, wherein each laminate comprises n interior composite layers, each having fibers of which the angle with the circumferential direction is, in terms of absolute value, less than or equal to 10°, n being a number greater than or equal to 1, and when n>1, interior composite layers being juxtaposed with one another and flanked on each side respectively by m exterior composite layers, and wherein each exterior composite layer has fibers that make, with the circumferential direction, an angle distinct from 0°, m ranging from 1 to 8 and, when m>1, the angle of the fibers of successive exterior composite layers positioned on a same side of an interior composite layer being identical or different.

2. The tire according to claim 1, wherein a mean overlap between the reinforcing strips of the two plies of reinforcing strips is greater than or equal to 20%.

3. The tire according to claim 1, wherein a mean overlap between the reinforcing strips of the two plies of strips is less than or equal to 80%.

4. The tire according to claim 1, wherein each ply of reinforcing strips is embedded in a matrix of rubber composition which, when cross-linked, has a secant extension modulus at 10% strain greater than or equal to 10 MPa.

5. The tire according to claim 1, wherein the angle of the fibers of two exterior composite layers positioned symmetrically on each side of an interior composite layer is identical.

6. The tire according to claim 1, wherein n ranges from 1 to 12.

7. The tire according to claim 1, wherein the angle of the fibers of two exterior composite layers positioned symmetrically on each side of an interior composite layer is identical in terms of absolute value but of opposite sign.

8. The tire according to claim 7, wherein n is greater than or equal to 3.

* * * * *